United States Patent [19]
Roach et al.

[11] Patent Number: 6,005,849
[45] Date of Patent: Dec. 21, 1999

[54] FULL-DUPLEX COMMUNICATION PROCESSOR WHICH CAN BE USED FOR FIBRE CHANNEL FRAMES

[75] Inventors: Bradley Roach, Newport Beach; Peter Fiacco; Greg Scherer, both of Yorba Linda, all of Calif.

[73] Assignee: Emulex Corporation, Costa Mesa, Calif.

[21] Appl. No.: 08/937,066

[22] Filed: Sep. 24, 1997

[51] Int. Cl.[6] .............................. H04B 1/56; H04L 5/14; H04L 12/28; H04L 12/56
[52] U.S. Cl. ............................................. 370/276; 370/389
[58] Field of Search ..................................... 370/276, 351, 370/428, 412, 397, 389, 409, 293, 294, 392, 395; 395/701

[56] References Cited

U.S. PATENT DOCUMENTS

| | | | |
|---|---|---|---|
| 4,829,475 | 5/1989 | Ward et al. ................................ | 365/78 |
| 5,185,736 | 2/1993 | Tyrrell et al. . | |
| 5,224,093 | 6/1993 | Denzel et al. ............................. | 370/60 |
| 5,305,253 | 4/1994 | Ward ......................................... | 365/73 |
| 5,426,639 | 6/1995 | Follett et al. ............................ | 370/94.1 |
| 5,444,853 | 8/1995 | Lentz ....................................... | 395/250 |
| 5,519,695 | 5/1996 | Purohit et al. ........................... | 370/58.2 |
| 5,546,347 | 8/1996 | Ko et al. ................................... | 365/221 |
| 5,548,590 | 8/1996 | Grant et al. ............................... | 370/61 |
| 5,638,518 | 6/1997 | Malladi .............................. | 395/200.21 |
| 5,717,689 | 2/1998 | Ayanoglu . | |
| 5,894,560 | 4/1999 | Carmichael et al. .................... | 395/845 |

OTHER PUBLICATIONS

Keiser et al., "Digital Telephony and Network Integration," Second Edition, Chapman & Hall, pp. 392–397, 1996.

*Primary Examiner*—Douglas W. Olms
*Assistant Examiner*—David R Vincent
*Attorney, Agent, or Firm*—Fish & Richardson P.C.

[57] ABSTRACT

A full duplex communication processor simultaneously sends and receives frames of data and commands. Separate transmit and receive protocol engines are controlled by separate sequencers. This enables frames of data to be received and transmitted simultaneously without involving a host CPU on a frame-by-frame basis.

26 Claims, 6 Drawing Sheets

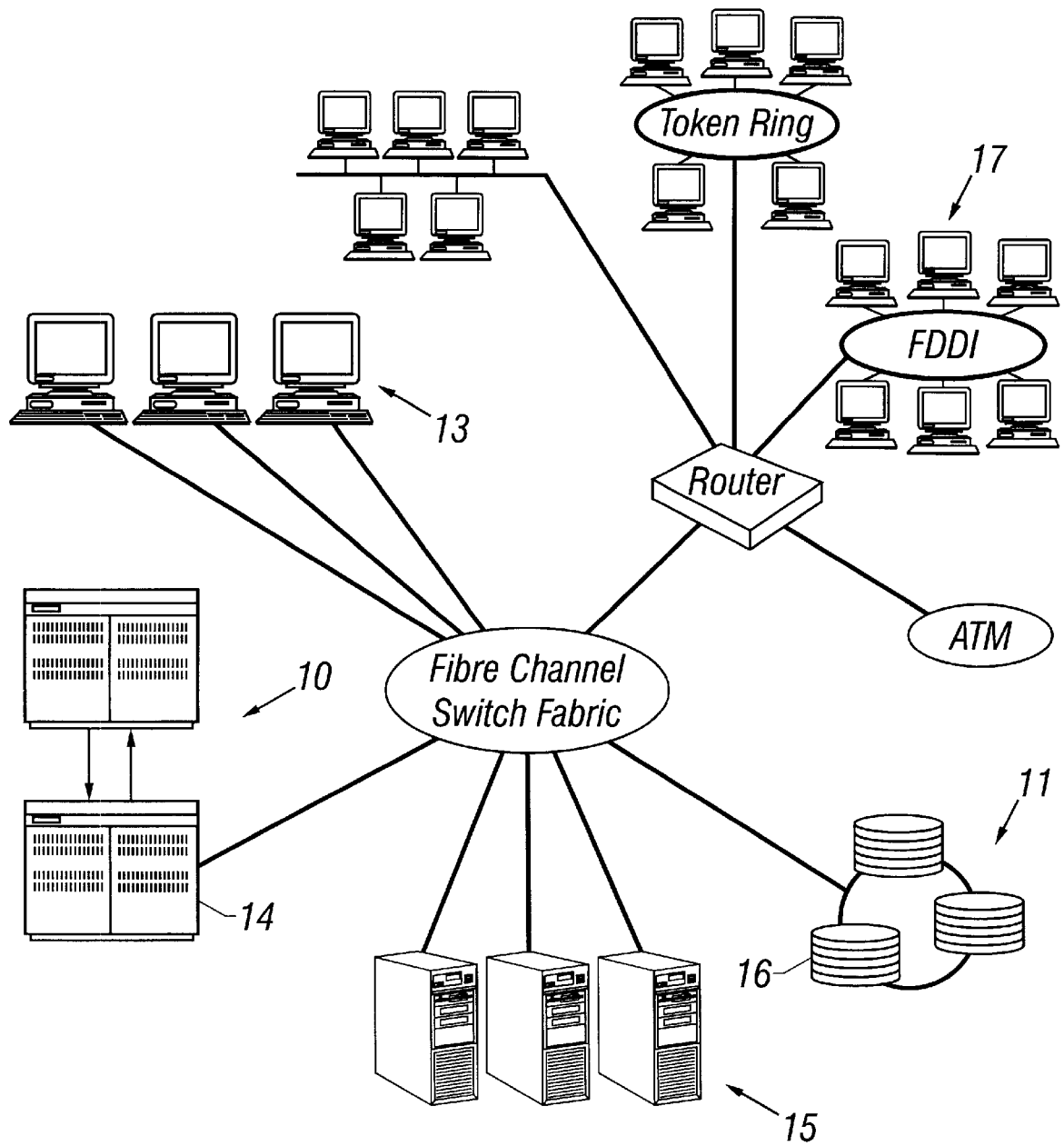
FIG. 1
*(PriorArt)*

FIBRE CHANNEL FRAME

FULL-DUPLEX COMMUNICATION PROCESSOR WHICH CAN BE USED FOR FIBRE CHANNEL FRAMES

BACKGROUND OF THE INVENTION

1. Field of the Invention

This invention relates to devices for transferring data in computer networks, and more particularly to a device for receiving, generating and transmitting frames of data across a computer network boundary.

2. Description of Related Art

The number of computers and peripherals has mushroomed in recent years. This has created a need for improved methods of interconnecting these devices. A wide variety of networking paradigms have been developed to enable different kinds of computers and peripheral components to communicate with each other.

There exists a bottleneck in the speed with which data can be exchanged along such networks. This is not surprising because increases in network architecture speeds have not is kept pace with faster computer processing speeds. The processing power of computer chips has historically doubled about every 18 months, creating increasingly powerful machines and bandwidth hungry applications. It has been estimated that one megabit per second of input/output is generally required per "MIPs" (millions of instructions per second) of processing power. With CPUs now easily exceeding 200 MIPs, it is difficult for network architecture to keep up with these faster speeds.

Area-wide networks (e.g., LANs and WANs) and channels are two approaches that have been developed for computer network architectures. Traditional networks offer a great deal of flexibility and relatively long distance capabilities. Channels, such as Enterprise System Connection (ESCON) and Small Computer System Interface (SCSI), have been developed for high performance and high reliability. Channels typically use dedicated short-distance connections between computers or between computers and peripherals.

Features of both channels and networks have been incorporated into a new network standard known as "Fibre Channel". Fibre Channel systems combine the speed and reliability of channels with the flexibility and connectivity of networks. Fibre Channel products currently can run at very high data rates, such as 266 or 1062 Mbps. These speeds are sufficient to handle quite demanding applications such as uncompressed, full motion, high-quality video.

There are generally three ways to deploy Fibre Channel: simple point-to-point connections; arbitrated loops; and switched fabrics. The simplest topology is the point-to-point configuration, which simply connects any two Fibre Channel systems directly. Arbitrated loops are Fibre Channel ring connections that provide shared access to bandwidth via arbitration. Switched Fibre Channel networks, called "fabrics", yield the highest performance by leveraging the benefits of cross-point switching.

The Fibre Channel fabric works something like a traditional phone system. The fabric can connect varied devices such as work stations, PCs, servers, routers, mainframes, and storage devices that have Fibre Channel interface ports. Each such device can have an origination port that "calls" the fabric by entering the address of a destination port in a frame header. The Fibre Channel specification defines the structure of this frame. (This frame structure raises data transfer issues that will be discussed below and addressed by the present invention). The Fibre Channel fabric does all the work of setting up the desired connection, hence the frame originator does not need to be concerned with complex routing algorithms. There are no complicated permanent virtual circuits (PVCs) to set up. Fibre Channel fabrics can handle more than 16 million addresses, and so are capable of accommodating very large networks. The fabric can be enlarged by simply adding ports. The aggregate data rate of a fully configured Fibre Channel network can be in the tera-bit-per-second range.

Each of the three basic types of Fibre Channel connections are shown in FIG. 1, which shows a number of ways of using Fibre Channel technology. In particular, point-to-point connections 10 are shown connecting mainframes to each other. A Fibre Channel arbitrated loop 11 is shown connecting disk storage units. A Fibre Channel switch fabric 12 connects work stations 13, mainframes 14, servers 15, disk drives 16 and local area networks (LANs) 17. The LANs include, for example, Ethernet, Token Ring and FDDI networks.

An ANSI specification (X3.230-1994) defines the Fibre Channel network. The specification distributes Fibre Channel functions among five layers. As shown in FIG. 2, the five functional layers of the Fibre Channel are: FC-0—the physical media layer; FC-1—the coding and decoding layer; FC-2—the actual transport mechanism, including the framing protocol and flow control between nodes; FC-3—the common services layer; and FC-4—the upper layer protocol.

While the Fibre Channel operates at relatively high speed, it would be desirable to increase speeds further to meet the needs of faster processors. One way to do this would be to eliminate, or reduce, delays that occur at interface points. One such delay occurs during the transfer of a frame from the FC-1 layer to the FC-2 layer. At this interface, devices linked by a Fibre Channel data link receive Fibre Channel frames serially. A protocol engine receives these frames and processes them at the next layer, the FC-2 layer shown in FIG. 2. The functions of the protocol engine includes validating each frame; queuing up DMA operations to transfer each frame to the host; and building transmit frames.

The high bit speeds of the Fibre Channel data link places extreme demands on the protocol engine. Hence, some protocol engines can only operate in half-duplex mode, which means that the protocol engine can process data in only one direction at a time. This significantly slows down the speed of the data transfer since either the transmit or the receive task must wait while the other task is performed.

Full-duplex protocol engines can process both received and transmitted frames simultaneously. Hence full-duplex protocol engines significantly improve data throughput. However, in full-duplex protocol engines, usually two microprocessors, each with local RAM, are required to respectively handle transmit and receive operations. The use of dual microprocessors for these functions greatly increases the cost of the protocol engine.

Conventional approaches to handling frames generally rely on the involvement of a host CPU on a frame-by-frame basis. For example, validation of received frames and setting up direct memory access (DMA) operations and acknowledgments typically involve the host CPU, which limits frame transmission and reception rates and prevents the host CPU from performing other tasks. Further, a host CPU with software protocol "stacks" cannot keep up with fast networks such as Fiber Channel.

In view of the foregoing, objects of the invention include: increasing data transfer processing speeds in high speed networks such as the Fibre Channel network; providing a technique that can speed up a protocol engine's processing of data frames; providing a protocol engine that can perform high speed full duplex processing of data without involving the host CPU on a frame-by-frame basis; minimizing data traffic between a protocol engine and a host CPU and system memory; and generally offloading protocol processing from a host CPU.

SUMMARY OF THE INVENTION

The invention is directed to the processing and transferring of frames of data in a computer data link. The invention is a full-duplex communication processor that uses dual micro-coded engines and specialized hardware to build transmit frames, validate receive frames, and set up host DMA operations without involving a host CPU and without one or more resident microprocessors. A preferred embodiment of the invention uses independent dedicated transmit and receive protocol processors. These independent processors communicate with each other using a transfer ready queue. A context manager provides context information that is used by the receive processor to validate received frames and by the transmit processor to build transmit frame headers.

More particularly, a preferred embodiment of the invention: 1) implements a full-duplex communication processor with independent transmit and receive processors that communicates directly to the host driver software through host memory resident "command", "unsolicited data", and "response" rings; 2) establishes communication between the dual processors to allow the receive processor to queue work for the transmit processor, which allows a remote device send a frame to the receive processor that will "wake-up" the transmit processor to send data to the remote device without involving the host CPU; and 3) establishes an interlocked information table that allows the transmit and receive processors to operate on the same Input/Output (I/O) command.

In a preferred embodiment, the data channel is a Fibre Channel data link and the full-duplex communication processor is configured to process FC-2 protocol Fibre Channel frames.

The details of the preferred embodiment of the present invention are set forth in the accompanying drawings and the description below. Once the details of the invention are known, numerous additional innovations and changes will become obvious to one skilled in the art.

BRIEF DESCRIPTION OF THE DRAWINGS

FIG. 1 is a block diagram of a prior art complex computer network utilizing Fibre Channel technology.

Like reference numbers and designations in the various drawings refer to like elements.

DETAILED DESCRIPTION OF THE INVENTION

The invention includes a full-duplex communication processor that improves frame transmission and frame reception rates in high speed data links such as the Fibre Channel. By using independent transmit and receive microcoded engines communicating directly to host driver software, full-duplex network communication is accomplished without involving the host CPU.

Figure 2:
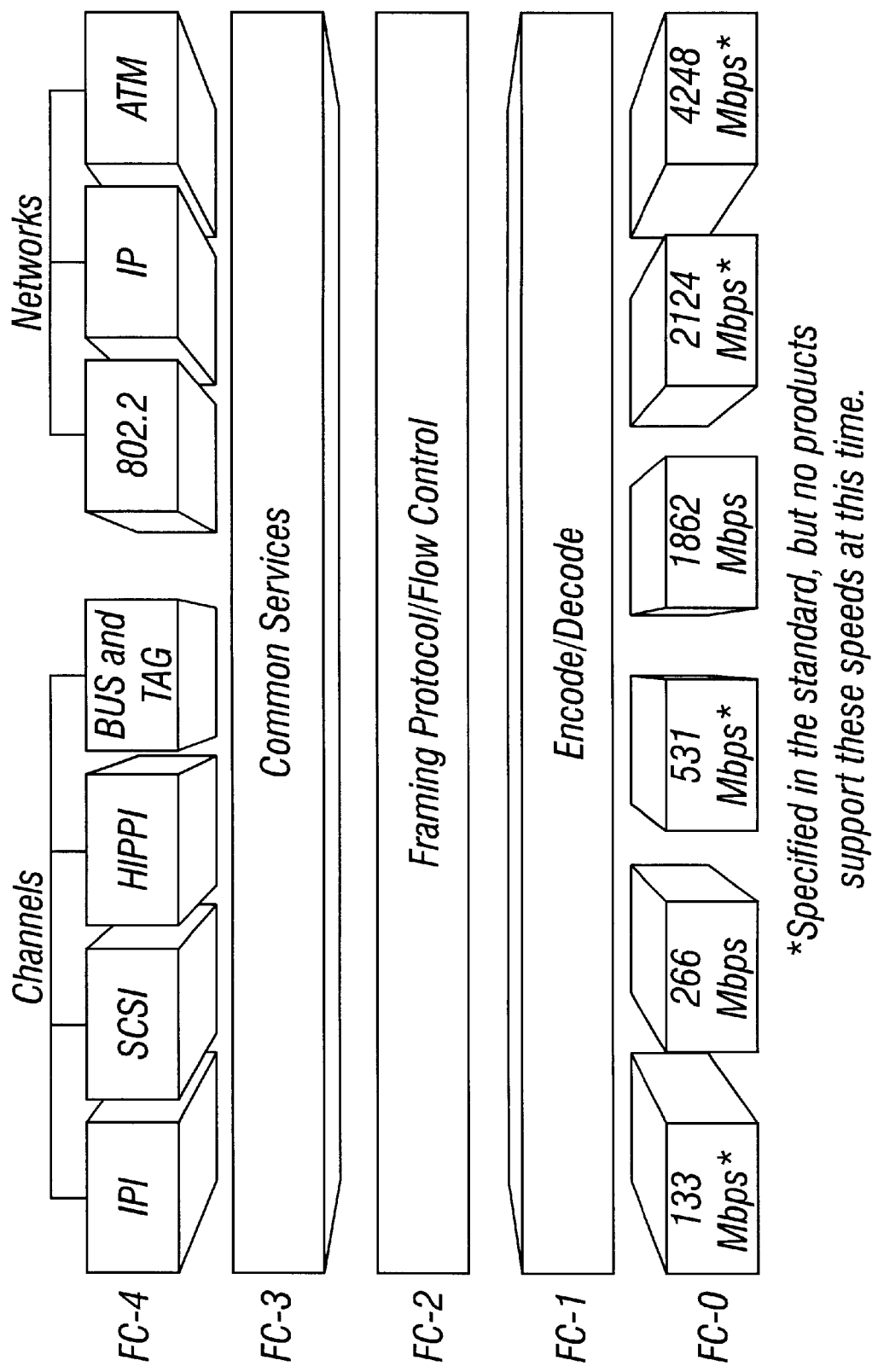
FIG. 2 is a diagram of the five functional layers of the prior art Fibre Channel standard.
Figure 3:
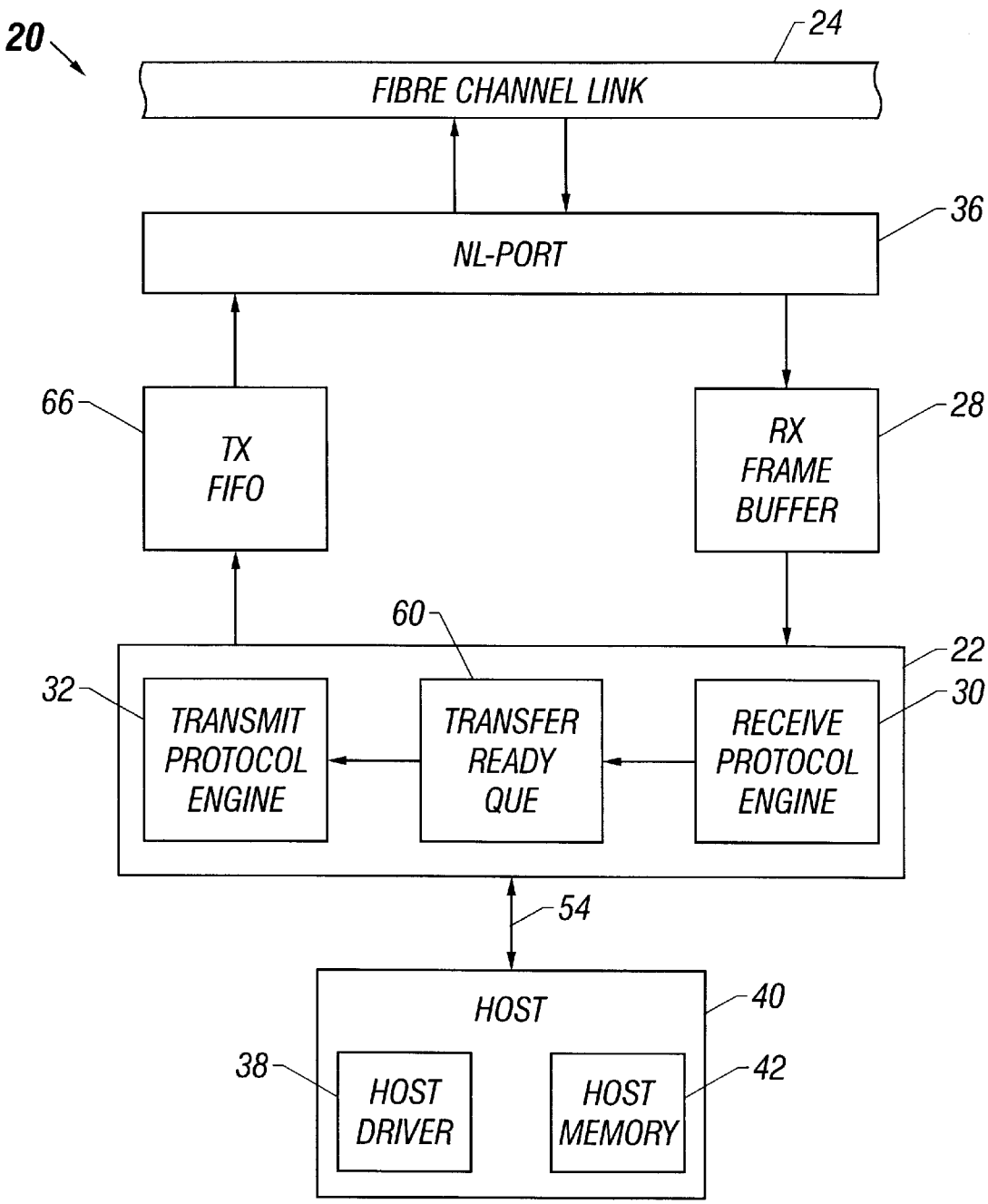
FIG. 3 is a simplified block diagram of a communication processing system in accordance with a preferred embodiment of the invention.
Figure 4:
FIG. 4 is a diagram of a typical prior art Fibre Channel frame of data.

FIG. 3 shows a Fibre Channel communication system 20 utilizing the full-duplex communication processor 22 in accordance with a preferred embodiment of the invention. Serial data is received along a Fibre Channel data link 24. Frames generally will comprise three portions, a preamble, a data or "payload" portion, and a trailer portion. In a Fibre Channel data link, for example, the Fibre Channel frame consists of a start of frame (SOF) word (four bytes); a data portion comprising a frame header (six bytes), between zero and 2112 payload bytes, and a cyclical redundancy check (CRC) word (4 bytes); and an end of frame (EOF) word (4 bytes). The frame header is used to control link applications, control device protocol transfers, and detect missing or out of order frames. The CRC word indicates whether there is a problem in the transmission, such as a data corruption, or whether some part of the frame was dropped during transmission.

Frames received from the Fibre Channel data link 24 are processed by an NL port 36 which decodes and parallelizes the incoming serial data into words. The NL port 36 assembles the words into frames. The NL port 36 also checks the CRC word for each frame received and adds a resulting "good-bad" CRC status indicator to other status information bits within an EOF status word that is generated from the EOF word. The NL port 36 then writes the frames into a receive frame FIFO buffer 28. Further details of a preferred FIFO buffer module 28 are described in co-pending patent application entitled "RECEIVE FRAME FIFO WITH END OF FRAME BYPASS", Ser. No. 08/937, 065 filed on Sep. 24, 1997, and assigned to the same assignee of the present invention, the disclosure of which is incorporated by reference.

Fibre Channel frames are then received by the full-duplex communication processor 22, also referred to as a protocol engine. Several functions are performed by the full duplex communication processor 22, including: 1) queuing up a host command to write the data in a received frame into host memory through direct memory access (DMA); 2) validating the frame header to ensure that the frame is the next logical frame that should be received; 3) determining whether the frame is defective or not; and 4) generating transmit frames in response to a received frame or host-generated transmit command.

Unlike conventional protocol engines, the full-duplex communication processor 22 does not include a microprocessor. Instead, dual microcoded engines are employed in order to separate the protocol engine receive tasks from the protocol engine transmit tasks. In particular, the full-duplex communication processor 22 includes a receive protocol engine 30 and a transmit protocol engine 32. These protocol engines communicate to each other through a transfer ready queue 60. The receive protocol engine 30 validates the receive frame headers received from the receive frame buffer 28. The transmit protocol engine 32 builds transmit frames and sends them to the Fibre Channel data link 24 through a transmit FIFO 66 and the NL port 36.

The full duplex communication processor 22 works in conjunction with a host computer 40 that includes host driver software 38 and host memory 42. In particular, the transmit and receive protocol engines 30, 32 communicate directly to the host driver software 38. Full-duplex communication is achieved because the receive and transmit protocol engines operate independently and concurrently. An interlocked context information table is used to permit the receive and transmit protocol engines to operate on the same I/O command, as described in more detail below.

The full-duplex communication processor 22 is able to process frames without involving the host CPU on a frame-by-frame basis. For example, one function of the full-duplex communication processor 22 is to allow a remote device to send a frame along the Fibre Channel link 24 to the receive protocol engine 30 which will "wake up" the transmit protocol engine 32 to send data to the remote device through the NL port 36 to the Fibre Channel link 24. Such data may reside, for example, in the host memory 42.

Figure 5A:
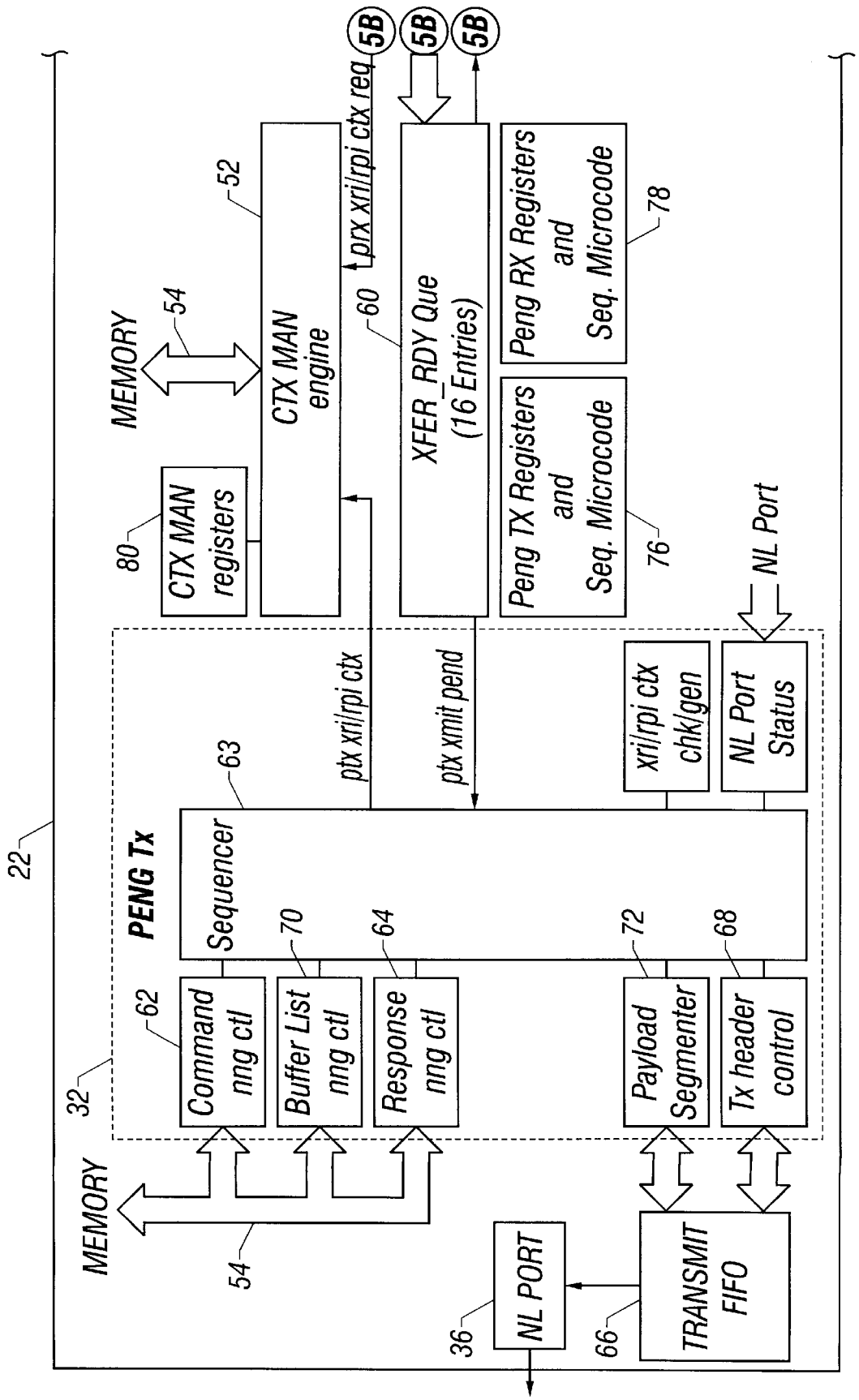
FIG. 5 is a simplified block diagram of a full-duplex communication processor in accordance with a preferred embodiment of the invention.
Figure 5B:
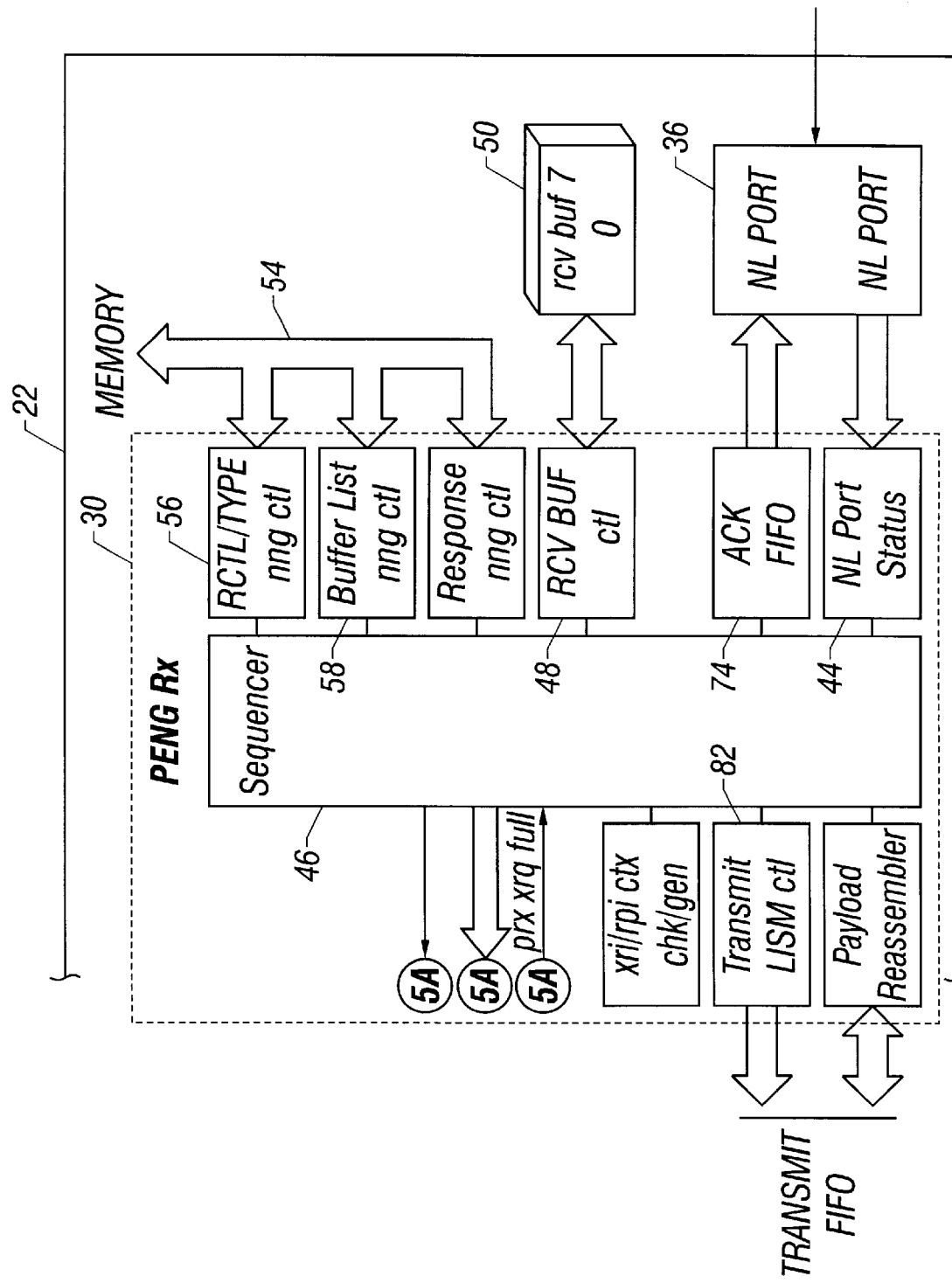

FIG. 5 shows additional details of the full-duplex communication processor 22 of a preferred embodiment of the invention. The full-duplex communication processor 22 includes data structures resident in host memory 42, which may include contiguous and non-contiguous physical memory.

A Fibre Channel frame is received by the receive protocol engine 30 through the NL port 36. An NL port status unit 44 performs the function of timing receive frame sequence and monitoring NL port interrupts. The received frame is sent through a sequencer 46 to a receive buffer control unit 48 which places the received frame in a receive buffer 50. The frame header in the receive buffer 50 is then automatically placed into the receive protocol engine 30.

A lookup field inside each frame header includes a pointer to an associated context. In general, the associated context is initialized by the host driver 38 within the host memory 42, and contains information indicating where to put a particular frame of data in host memory 42. More particularly, the context contains fields such as maximum frame size, current buffer pointer and length, and small computer systems interface (SCSI) state information, defined in a list of buffers.

The host memory unit 42 typically will comprise many megabytes of memory, and each particular frame will fit into one slot in that memory. Each frame header tells the receive protocol engine 30 which context to access or "pull down" for that particular frame so that the receive protocol engine can validate that frame. The context is pulled down from the host memory 42 under control of the context manager engine 52 through a host memory interface 54. The receive protocol engine sequencer 46 then validates the frame.

Once frame validation is complete, the context pointed to by a frame header will tell the receive protocol engine 30 what to do with the frame. There are a number of possibilities, including: 1) send the frame out the Routing Control/Type (R_CTL/TYPE) ring control unit 56 where it then is sent to host memory 42 through the host memory interface 54; 2) send the frame through the Buffer List ring control unit 58 to one segment in the buffer pointer list inside host memory; and 3) process a non-data receive frame and associated payload. (For example, the frame may be a communication frame such as a "transfer ready" that tells the transmitter that the target is now ready to accept data. This would cause the receive frame to pass to the transfer ready queue 60. The transmit command would then be sent to the transmit protocol engine 32).

The second case involves sending a frame to a buffer pointer list, which is a sequential list of buffer descriptors. The first entry in the list contains the total transfer size in bytes. In the illustrated embodiment, only word transfers are performed by the full-duplex communication processor 22. Hence, if the total transfer size is not an integral number of 4-byte words, additional bytes are transferred to the next boundary. Subsequent entries in the buffer list is consist of two parts each, one part being a multi-byte address that points to the start of a buffer and the other part being the size and usage of the buffer.

In accordance with the invention, each buffer pointer list includes buffer list modifier (BLM) bits that describe the buffer usage and which are used to build an outgoing Fibre Channel frame header (the FC-2 header) for each transmit frame. The full-duplex communication processor 22 must build the frame header and corresponding frame control (F_CTL) bits, and transfer the frame header to a transmit FIFO 66 before transferring the payload via a DMA operation. The BLM bits and the buffer lengths in the buffer lists assist the full-duplex communication processor 22 in determining whether a frame is the last one in a series of frames. For the receive protocol engine, the BLM bits control proper placement of received data and status information into the buffer segments. The BLM bits are described in related patent application Ser. No. 08/937,065 entitled "COMMUNICATION PROCESSOR HAVING BUFFER LIST MODIFIER CONTROL BITS", filed on Sep. 24, 1997, and assigned to the same assignee as the present invention, the disclosure of which is incorporated by reference.

One example of a task performed by the full-duplex communication processor 22 is the processing of a command to write data to a disk drive on the Fibre Channel link 24 from a remote device. A write command is sent and the full-duplex communication processor transfers the command to the disk drive which sends back a transfer ready message to the receive protocol engine 30 indicating that the disk drive is ready to accept the data. This message goes to the transfer ready queue 60 which instructs the transmit protocol engine 32 to retrieve the data from host memory 42, generate a frame and transmit the data to the disk drive.

The transmit protocol engine 32 is triggered by either of two events: one is the presence of an entry in the transfer ready queue 60, and the other is by action of the command ring controller 62. An Exchange Context Resource Index (XRI), described below, is used to process each command. The command ring is a circular queue of command entries, generally read and write commands. These read and write commands can be used, for example, to communicate commands to a remote device such as a disk drive. The size and base memory address of the command ring is specified in a command ring base register which contains "put" and "get" pointers that are used for managing the command ring as follows: the host driver 38 manages the put pointer, incrementing the pointer whenever a command is queued to the command ring 62. The full-duplex communication processor 22 manages the get pointer, incrementing the pointer whenever a command is read from the ring.

A command other than a full-frame transmission provides a pointer to a buffer pointer list. The buffer pointer list contains the total transfer size in the first buffer list entry and buffer pointer-size pairs in subsequent buffer list entries. The XRI field in the command will then be used to instruct the context manager 52 to pull down the appropriate context to the transmit protocol engine 32. This transfer, called an exchange, tells the transmit protocol engine 32 where the engine is in that particular buffer ring list, how much data the frame has and what stage it is in, etc. The context also contains the next frame header. The next frame header is initially built by the host driver 38 but thereafter the transmit protocol engine 32 builds subsequent frame headers. The context manager 52 retrieves each frame header from the host memory 42 and passes the header to the transmit header controller 68, which sends the frame header to the NL port 36 through the transmit FIFO 66.

Once a frame header is built, the system begins following the buffer list in a process that gathers data from host memory. The context for a command contains a pointer to the buffer list. One entry at a time is pulled down from the buffer list by the buffer list ring controller 70. The frame header is transferred to the transmit FIFO 66 through a transmit header control 68. A payload segmenter 72 begins to pull in payload (frame data) and put the payload data into the transmit FIFO 66. Once a frame header and the payload data are in the transmit FIFO 66, the last task is to write an end of frame (EOF) word to the transmit FIFO 66. The EOF word is an indication to the NL port 36 to begin transmitting the assembled frame onto the Fiber Channel link 24. Once all frames are sent out successfully, a response is generated which is sent to the host driver 38, indicating that the frames associated with the pending command were, in fact, sent out successfully.

Likewise, the receive protocol engine 30 contains an acknowledge FIFO 74 which generates an acknowledge frame (basically a modified form of the receive frame header) that is sent back over the Fibre Channel link 24 to the sender to acknowledge receipt.

The full-duplex communication processor 22 also includes receive and transmit protocol engine registers 76 and 78. These registers contain autonomous protocol management functions that are linked and synchronized through the context registers in the context manager 52. The context manager 52 manages coherency and caching of exchange context from the host memory 42, and also synchronizes accesses by the receive and transmit protocol engine 30, 32 to the cached exchange context contained in the context registers 80.

In the preferred embodiment, the context manager 52 and the receive and transmit protocol engines 30, 32 communicate with the host 40 through host memory interface 54 which includes a peripheral components interface (PCI), direct memory access (DMA) controller (not shown), and a PCI slave interface (not shown). The protocol engine registers 76, 78 contain the PCI slave interface and interrupt controller for the protocol engines 30, 32. The context manager 52, receive and transmit protocol engines 30, 32 provide status to and from the protocol engine register 76, 78 for the PCI slave interface and interrupt controller.

The receive and transmit protocol engines 30, 32 implement the Fibre Channel protocol by using two independent programmable sequencers 46 and 63. The use of sequencers 46, 63 allows the protocol engine state machine to be implemented in a variable writable control store RAM, which is downloaded into the receive and transmit protocol engine registers 76, 78 during initialization. The host 40 can access this writable control store RAM and can read and write the writable control store RAM through a protocol register map. The use of the sequencers adds great flexibility to the protocol engine state machine implementation since, by changing code in the writable control store RAM, new or different functionality can be downloaded to the full-duplex communication processor 22.

The full-duplex communication processor 22 can be implemented on a single chip (such as an application specific integrated circuit (ASIC)), alone or together with other functions. For example, in the illustrated embodiment, the full-duplex communication processor 22 can cache one instance of the most recent transmit and receive context. However, by adding additional on-chip memory, additional instances of context can be cached.

XRI Context

In the preferred embodiment, each context is divided into two host memory structures: remote port context and exchange context. An exchange context is contained in an Exchange Context Resource Index (XRI) which is used to process a command. In particular, an exchange context is a structure that describes a complete exchange or controls transmission of one or more sequences. The structure is pointed to by an entry in an exchange pointer table. An XRI context contains the supporting context needed for an operation to take place immediately or through separate sequences. The data to send, or the buffers to receive data, are described by a buffer pointer list consisting of a set of buffer list entries that point to the actual buffers. As described above, a buffer list entry contains the address and length of a buffer and control bits to indicate sequence initiative, end of exchange, end of sequence, etc. For multiple-sequence operations the XRI context provides storage for working-register contents.

In the preferred embodiment, the XRI contexts are used by the full-duplex communication processor 22 for: Fibre Channel Protocol (FCP) exchanges that it originates; transmission exchanges; and temporary purposes to control transmission of a single frame or multiple frame sequences. The XRI context may be used by the host driver 38 for keeping track of exchanges for which data is received into buffer ring buffers.

Figure 6:
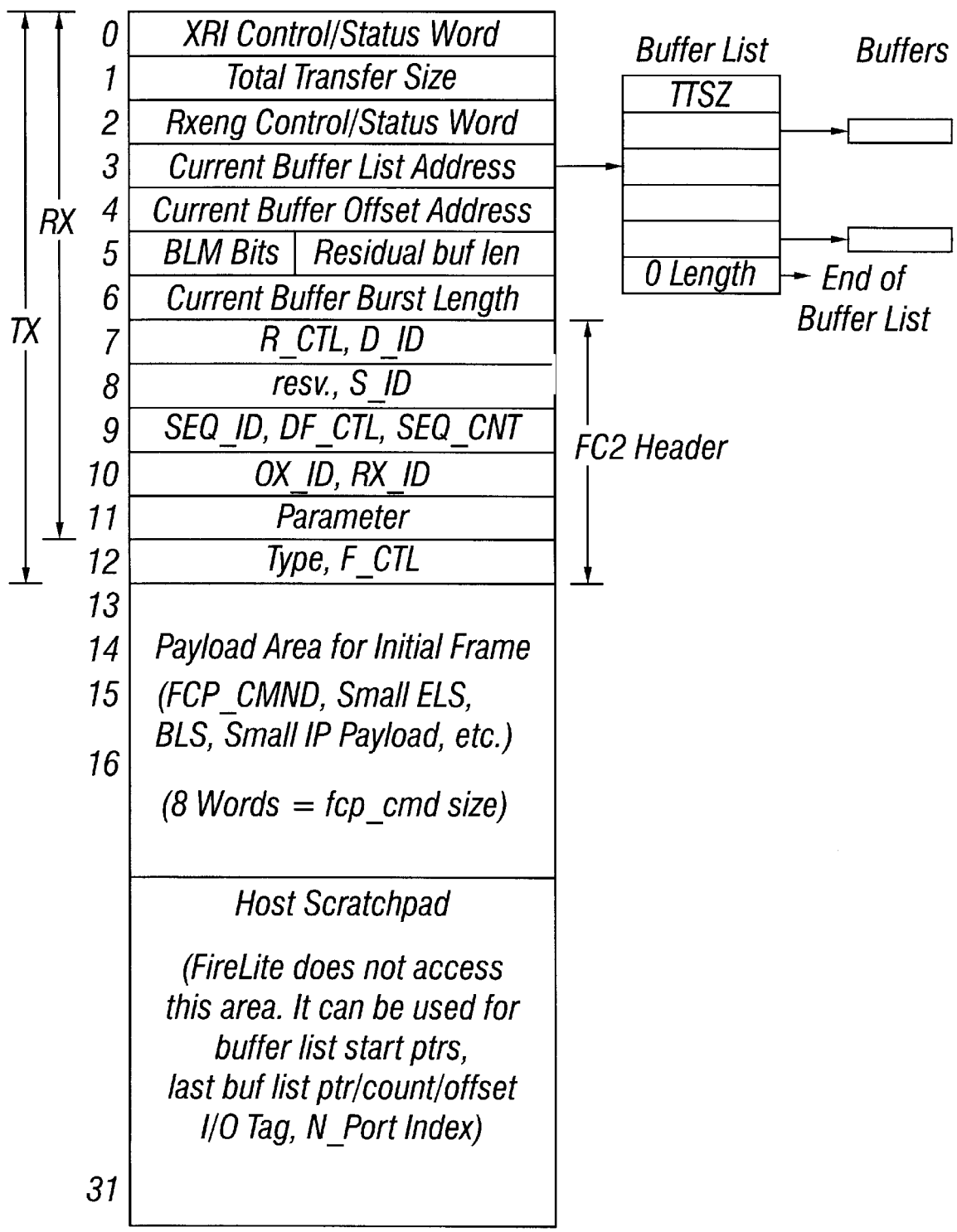
FIG. 6 is a diagram of an Exchange Context Resource Index (XRI) in accordance with a preferred embodiment of the invention.

An example of an XRI context is shown in FIG. 6. The first word is the XRI control-status word. The XRI control-status word contains configuration fields that are set by the host driver. The Total Transfer Size word reflects sequencer activity. For Fibre Channel protocol (FCP) originated exchanges, the XRI control-status word shows the remaining byte count for write operations and the cumulative received byte count for read operations. For transmit sequence commands, the XRI control-status word shows the remaining byte count if the operation is halted before the complete sequence is transmitted. The Rxeng control-status word is used by the receive protocol engine 30 to validate frames. The Current Buffer List Address word reflects sequencer activity, as does the Current Buffer Offset Address word.

The buffer list modifier (BLM) bits are set from the corresponding bits of a buffer list entry (BLE) read under sequencer control. The Residual Buffer Length in word five reflects sequencer activity. Whenever a sequencer reads a BLE, this field receives the buffer word count. Whenever a sequencer issues a DMA operation to transfer data to or from the buffer, the word count is reduced by the length of the transfer data. The Current Buffer Burst Length word also reflects transmit sequencer activity.

The Fibre Channel FC-2 header, in words 7–12, is used to generate header information for each frame transmitted by the transmit protocol engine 22.

Referring again to FIG. 5, the R_CTL/TYPE ring control 56 controls buffer rings that are used to receive all frames except FCP responder frames, i.e., for a locally originated FCP exchange. Three R_CTL/TYPE buffer rings assist the host in demultiplexing incoming frames for the appropriate driver entry points. An R_CTL/TYPE buffer ring is a fixed-size sequential list of buffer descriptors. The list is managed by hardware as a logical ring. Buffer descriptors are like buffer list entries in a buffer pointer list, but do not contain BLM bits.

The host driver 42 specifies the location and size of each buffer ring in the corresponding base register. Specific registers specify which entries in the R_CTL/TYPE buffer rings are valid. Each register consists of a put pointer and a get pointer. The receive buffers for each ring are used in the exact order in which the host driver put the corresponding buffer descriptions into the ring.

Loop initialization is initiated locally under host control or remotely by some other port. The host driver 38, the transmit and receive sequencers 46, 63, and the NL port 36 logic, all work together to complete the loop initialization procedure. During this procedure, the host driver either originates or passes on Fibre Channel Extended Link Services (ELS) frames that determine the addresses and capabilities of the ports on the loop. The host driver 38 is responsible for issuing Loop Initialization Select Master (LISM) ELS frames which facilitate the loop initialization process.

Initialization is needed because both the receive and transmit protocol engines 30, 32 are basically two autonomous engines running in full-duplex and they have minimal communication between the two of them. During initialization, the transmit protocol engine 32 is turned off and the receive protocol engine 30 is allowed to receive frames and then send them through the transmit protocol engine 32. Thus, the receive protocol engine takes up "ownership" of the transmit protocol engine hardware and uses that hardware to forward frames, in particular, the LISM frames which are transmitted utilizing the transmit LISM control module 82.

The full-duplex communication processor of the present invention allows the development of a low-cost network interface card that does not require a microprocessor with local RAM, and further offers the following advantages:

independent transmit and receive processors;
the receive processor can queue work for the transmit processor;
an interlocked information table allows the transmit and receive engines to operate on the same I/O command;
the transmit and receive processors can follow a single buffer list where the host can queue memory buffers that are a different size from the transmit or receive frames;
receive frames are validated against the interlocked information table without involving the host CPU;
acknowledges to receive frames are generated without involving the host CPU;
efficient suspend/resume of I/O operations.

A number of embodiments of the present invention have been described. Nevertheless, it will be understood that various modifications may be made without departing from the spirit and scope of the invention. Accordingly, it is to be understood that the invention is not to be limited by the specific illustrated embodiments, but only by the scope of the claims.

What is claimed is:

1. A full-duplex communication processor comprising:
(a) a receive processor coupled to a non-switched port of a computer network for receiving and validating frames of data, wherein the frames of data include commands;
(b) a transmit processor coupled to said non-switched port for constructing transmit frames;
(c) a transfer ready queue coupled between the transmit and receive processors, for transmitting commands in each frame of data having commands from the receive processor to the transmit processor;
(d) an interface circuit for coupling the receive and transmit processors and the transfer ready queue with a programmed host computer including a CPU and host memory; and
(e) interlocked information table containing context information wherein the receive frame processor uses the context information to process receive frames without frame by frame involvement of said CPU.

2. A communication processor according to claim 1, wherein the receive processor uses the context information to validate receive frames.

3. A communication processor according to claim 1, wherein the transmit processor uses the context information to build transmit frames.

4. A communication processor according to claims 2 or 3, further comprising a context manager for processing the context information, the context manager being under the control of host driver software.

5. A communication processor according to claim 1, wherein the transmit and receive processors each comprise independent microcoded engines, whereby the receive and transmit processors can each simultaneously process respective receive and transmit frames.

6. A communication processor according to claim 5, wherein the microcoded engines are sequencers, and the communication processor does not include a microprocessor.

7. A communication processor according to claim 1, wherein the frames of data are Fibre Channel frames.

8. A communication processor according to claim 7, wherein the receive and transmit processors each implement an FC-2 Fibre Channel communications protocol.

9. A communication processor according to claim 1, wherein the receive and transmit processors and the transfer ready queue are contained within a single integrated circuit.

10. A communication processor according to claim 1, wherein the interface circuit includes a direct memory access (DMA) interface.

11. A method of processing frames of data in a computer network comprising:
(a) receiving a first frame of data in a microcoded receive processor coupled to the computer network;
(b) transferring the first frame from the receive processor to a transfer ready queue;
(c) storing contextual information relating to the frame of data in an information table;
(d) using the contextual information to validate the first frame of data;
(e) transferring the first frame of data from the transfer ready queue to a microcoded transmit processor coupled to said non-switch port;
(f) constructing a transmit frame using information stored in the first frame of data in the transmit processor; and
(g) transferring the transmit frame to said non-switch port while simultaneously receiving a second fame of data in the receive processor without frame by frame involvement of a CPU of a host computer.

12. A method according to claim 11, wherein the first and second frames of data are Fibre Channel frames and the step of constructing a transmit frame includes the step of constructing a Fibre Channel transmit frame.

13. A method according to claim 11, further comprising the step of processing the context information in a context manager.

14. A method according to claim 11, further comprising the steps of coupling the receive and transmit processors to said host computer, and using host driver software in the host computer to control the receive and transmit processors.

15. A method of according to claim 14, further comprising the step of storing the contextual information in memory located in the host computer.

16. A method according to claim 14, further comprising the step of coupling the receive and transmit processors to the host computer through a direct memory access (DMA) interface.

17. A computer network comprising:
 (a) source and destination computer devices;
 (b) communication channel coupled to the source and destination computer devices;
 (c) a receive processor coupled to the communication channel for receiving and validating frames of data from the source computer device, wherein the frames of data include commands;
 (d) a transmit processor coupled to the computer network for constructing transmit frames;
 (e) a transfer ready queue coupled between the transmit and receive processors, for transmitting commands in the frames of data having commands from the receive processor to the transmit processor;
 (f) a host computer including a CPU, memory and host driver software;
 (g) interface means for coupling the receive and transmit processors and the transfer ready queue with the host computer; and
 (h) interlocked information table containing context information wherein the receive frame processor uses the context information to process the receive frames without frame by frame involvement of said CPU.

18. A computer network according to claim 17, wherein the receive frame processor uses the context information to validate receive frames.

19. A computer network according to claim 17, wherein the transmit frame processor uses the context information to build transmit frames.

20. A computer network according to claim 17, further comprising a context manager for processing the context information, the context manager being under the control of the host driver software.

21. A computer network according to claim 17, wherein the frames of data are Fibre Channel frames.

22. A computer network according to claim 21, wherein the receive and transmit frame processors each implement an FC-2 Fibre Channel communications protocol.

23. A computer network according to claim 17, wherein the interface means includes a direct memory access (DMA) interface.

24. A communication processor according to claim 17, wherein the interlocked information table is located in the host memory.

25. A communication processor according to claim 17, wherein the context information includes remote port context and exchange context.

26. A communication processor according to claim 17, wherein the frame includes a header having lookup fields indicating particular context information.

* * * * *